(12) United States Patent
Sugita et al.

(10) Patent No.: US 10,360,444 B2
(45) Date of Patent: Jul. 23, 2019

(54) IMAGE PROCESSING APPARATUS, METHOD AND STORAGE MEDIUM

(71) Applicant: KABUSHIKI KAISHA TOSHIBA, Tokyo (JP)

(72) Inventors: Kaoru Sugita, Tokyo (JP); Masahiro Sekine, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/941,881

(22) Filed: Nov. 16, 2015

(65) Prior Publication Data

US 2016/0371542 A1 Dec. 22, 2016

(30) Foreign Application Priority Data

Jun. 16, 2015 (JP) .................. 2015-121094

(51) Int. Cl.
*G06T 7/00* (2017.01)
*G06K 9/00* (2006.01)
(Continued)

(52) U.S. Cl.
CPC ........... *G06K 9/00369* (2013.01); *G06F 3/00* (2013.01); *G06K 9/00201* (2013.01); *G06T 19/00* (2013.01)

(58) Field of Classification Search
CPC ............ G06K 9/00201; G06K 9/00369; G06T 2207/30196; G06T 7/50; G06T 17/00; G06T 2207/20212; G06T 2210/16; G06T 13/20; G06T 2200/04; G06T 2200/24; G06T 2207/10028; A41H 1/02
(Continued)

(56) References Cited

U.S. PATENT DOCUMENTS 7,046,838 B1  5/2006 Sakagawa et al.
7,308,332 B2  12/2007 Okada et al.
(Continued)

FOREIGN PATENT DOCUMENTS

JP  2000-251078  9/2000
JP  2000-287223  10/2000
(Continued)

OTHER PUBLICATIONS

Hiroki Yamada et al. (Image-Based Virtual Fitting System with Garment Image Reshaping, 2014, IEEE, pp. 47-54).*
(Continued)

*Primary Examiner* — Iman K Kholdebarin
(74) *Attorney, Agent, or Firm* — Nixon & Vanderhye, P.C.

(57) ABSTRACT

According to one embodiment, an image processing apparatus includes a first acquisition module, a receiver, a second acquisition module, a calculator, a generator and an output module. The first acquisition module acquires first model data indicating a shape corresponding to a subject. The receiver receives pose data indicating a pose. The second acquisition module acquires second model data indicating a shape corresponding to a body shape of the subject and the pose indicated by the pose data. The calculator calculates an evaluation value based on the first and second model data. The generator generates notification information based on the evaluation value. The output module outputs the notification information.

15 Claims, 10 Drawing Sheets

(51) Int. Cl.
*G06T 19/00* (2011.01)
*G06F 3/00* (2006.01)

(58) Field of Classification Search
USPC .......................................................... 382/154
See application file for complete search history.

(56) References Cited

U.S. PATENT DOCUMENTS

| | | | | |
|---|---|---|---|---|
| 8,139,067 | B2* | 3/2012 | Anguelov | G06T 13/40 345/419 |
| 8,307,560 | B2* | 11/2012 | Tulin | A41H 1/02 33/11 |
| 8,525,828 | B1* | 9/2013 | Bates | G06T 17/00 345/419 |
| 8,571,698 | B2* | 10/2013 | Chen | G01B 11/2513 700/135 |
| 8,605,148 | B2* | 12/2013 | Robertson | H04N 5/275 348/135 |
| 8,908,928 | B1* | 12/2014 | Hansen | G06K 9/00362 382/111 |
| 8,976,230 | B1* | 3/2015 | Vendrow | H04N 5/76 348/46 |
| 9,240,067 | B2* | 1/2016 | Yomdin | G06T 13/40 |
| 9,355,305 | B2* | 5/2016 | Tanabiki | G06T 7/75 |
| 2006/0202986 | A1 | 9/2006 | Okada et al. | |
| 2013/0110666 | A1* | 5/2013 | Aubrey | G06Q 30/0269 705/26.5 |
| 2013/0171601 | A1 | 7/2013 | Yuasa et al. | |
| 2016/0042565 | A1* | 2/2016 | Osada | G06Q 30/0643 345/632 |
| 2016/0371542 | A1* | 12/2016 | Sugita | G06K 9/00369 |

FOREIGN PATENT DOCUMENTS

| | | |
|---|---|---|
| JP | 4473754 | 3/2010 |
| JP | 2014-55814 | 3/2014 |
| WO | 2012/039467 | 3/2012 |

OTHER PUBLICATIONS

Yamada, Image-based virtual fitting system with Garment Image reshaping, 2014, International Conference on Cyberworlds, 2014 IEEE.*

Yamada, Image-based virtual fitting system with Garment Image reshaping, 2014, International Conference on Cyberworlds, 2014 IEEE (Year: 2014).*

D. Anguelov et al., "SCAPE: Shape Completion and Animation of People", SIGGRAPH 05 ACM SIGGRAPH 2005 Papers, Jul. 31, 2005, pp. 408-416.

F. Perbet et al., "Human Body Shape Estimation Using a Multi-Resolution Manifold Forest", 2014 Conference on Computer Vision and Pattern Recognition (CVPR), Jun. 2014, pp. 668-675.

D. Anguelov, Dissertation—"Learning Models of Shape from 3D Range Data", Dec. 2005, 203 pages.

S. Zhou et al., "Parametric Reshaping of Human Bodies in Images", ACM Transactions on Graphics (TOG)—Proceedings of ACM SIGGRAPH 2010, vol. 29 Issue 4, Article No. 126, Jul. 26, 2010, 10 pages.

* cited by examiner

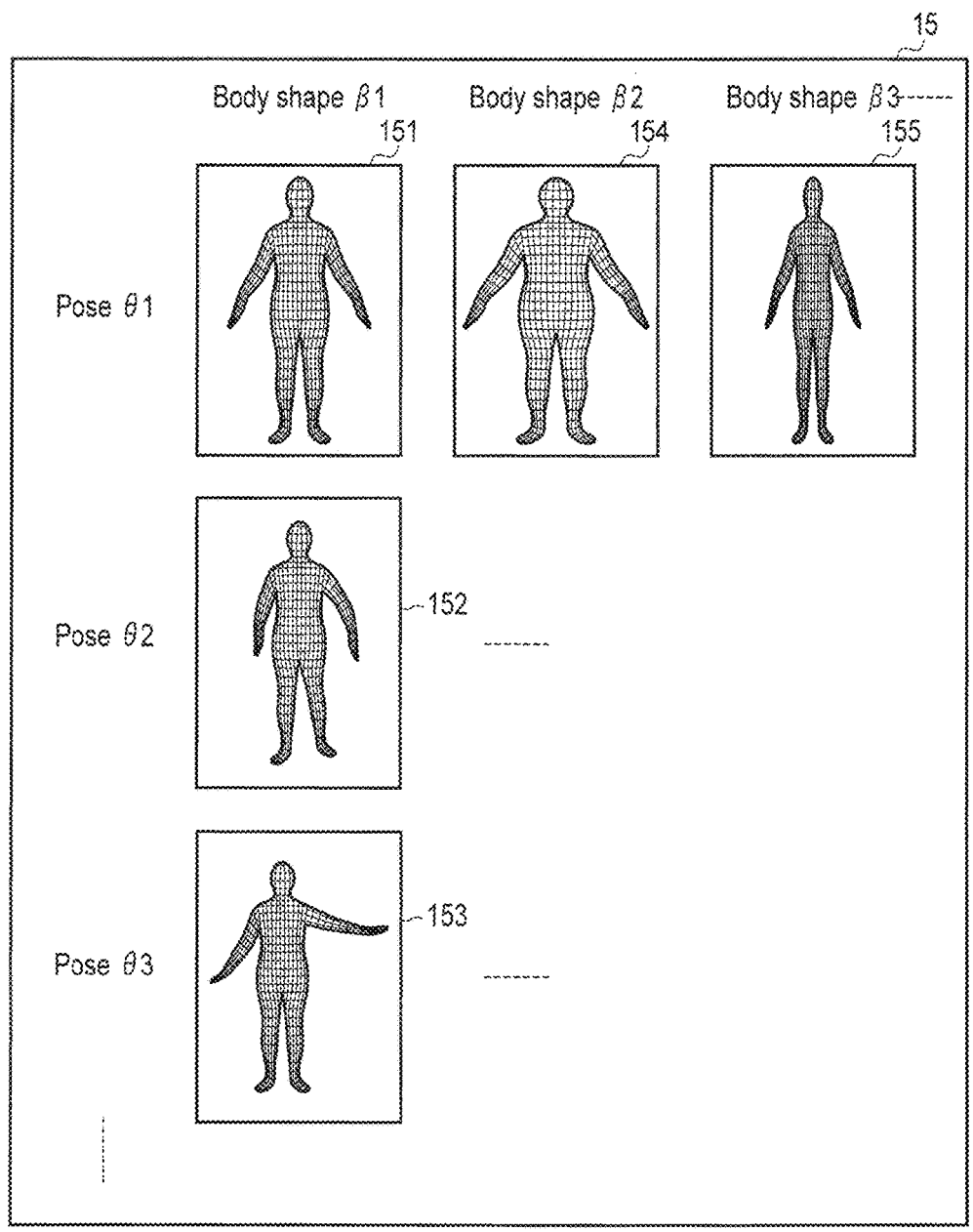
F I G. 3

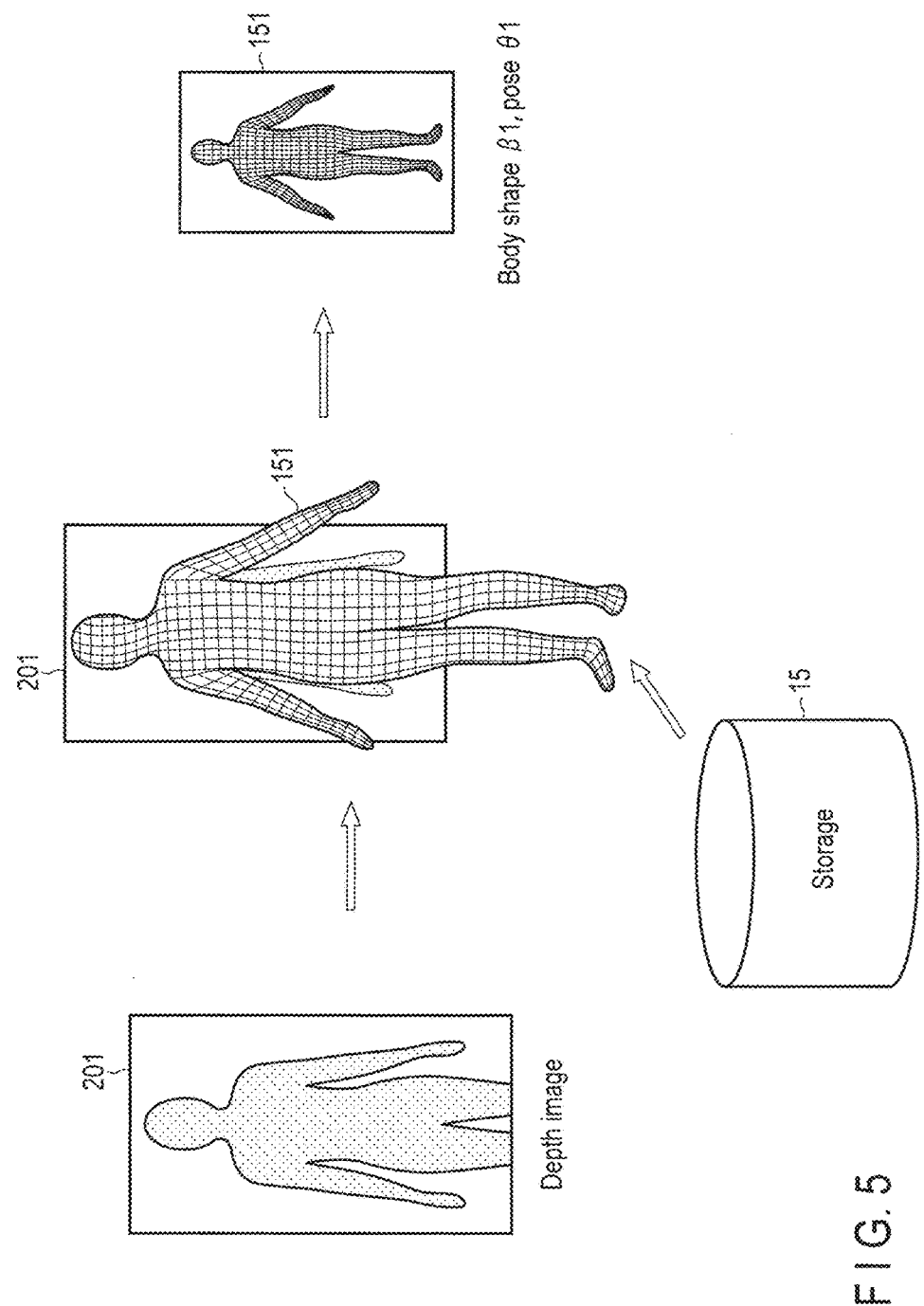
F I G. 5

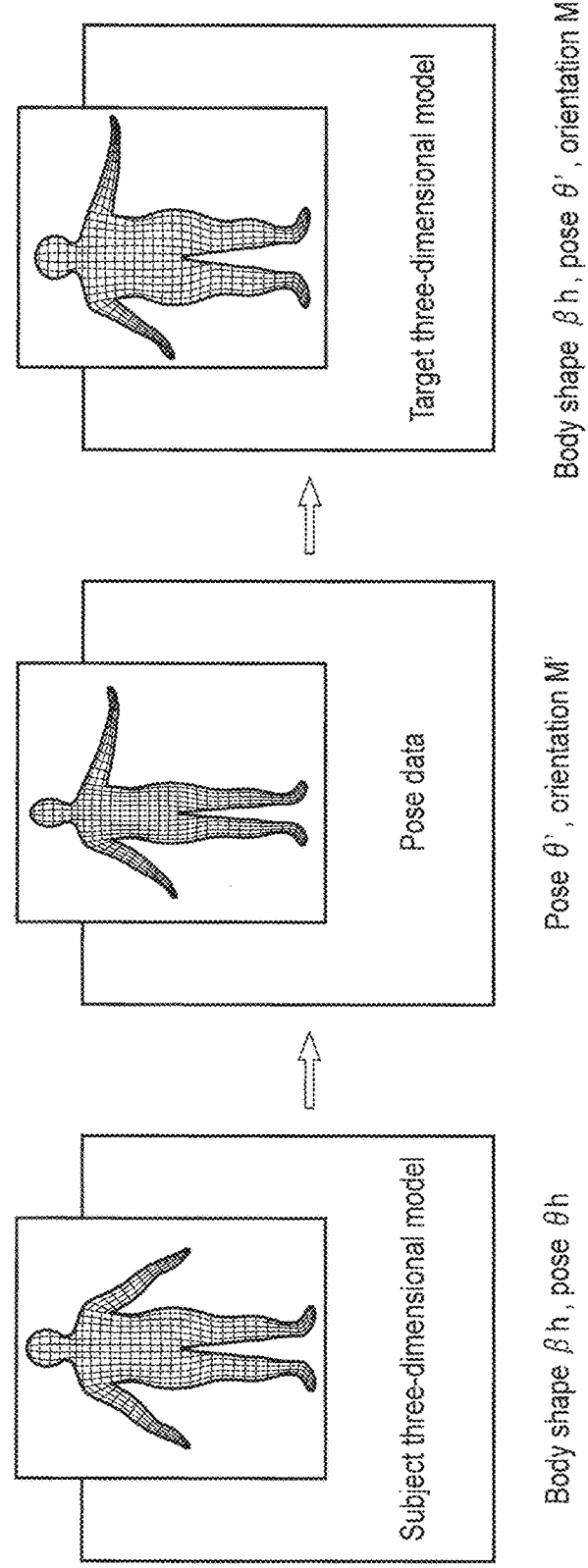
F I G. 6

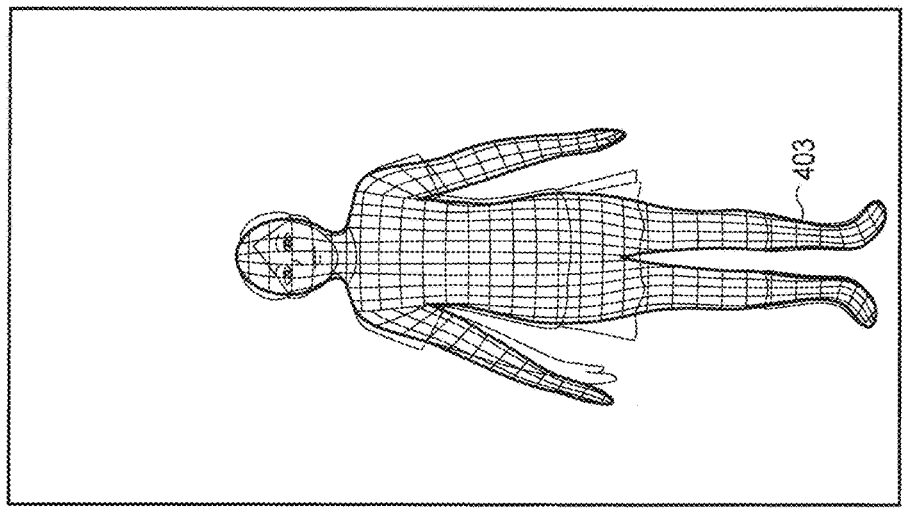
F I G. 10
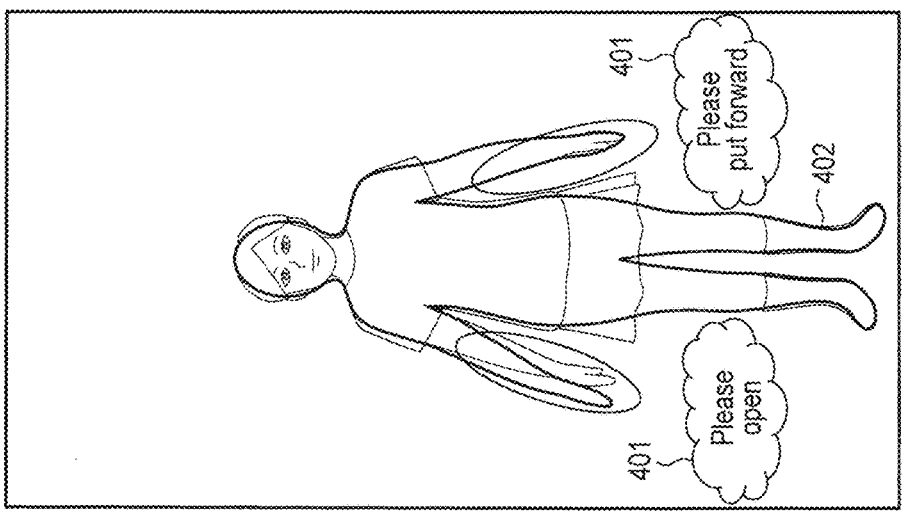
F I G. 9

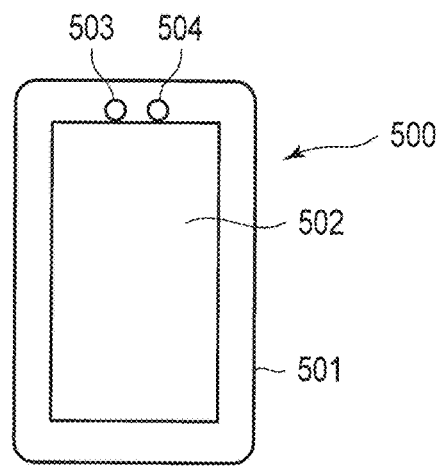
F I G. 11
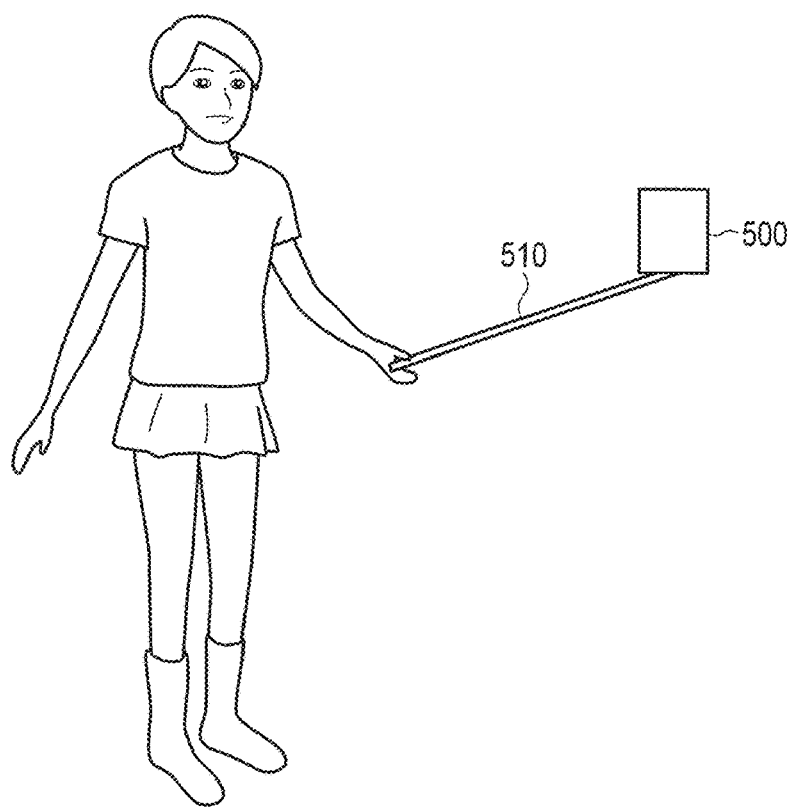
F I G. 12

IMAGE PROCESSING APPARATUS, METHOD AND STORAGE MEDIUM

CROSS-REFERENCE TO RELATED APPLICATIONS

This application is based upon and claims the benefit of priority from Japanese Patent Application No. 2015-121094, filed Jun. 16, 2015, the entire contents of which are incorporated herein by reference.

FIELD

Embodiments described herein relate generally to an image processing apparatus, a method and a storage medium.

BACKGROUND

Recently, a technique for, for example, enabling a subject (user), whose image is captured by an image-capture module, to virtually do a trial fitting of clothing (hereinafter, referred to as a virtual trial fitting) has been developed.

In this technique, since a composite image obtained by superimposing an image of clothing (hereinafter, referred to a clothing image) upon an image (hereinafter, a subject image) of a subject captured by the image-capture module is displayed, the subject can confirm a state where they wear clothing as a trail fitting target, without an actual trial fitting.

The clothing image is pre-produced by scanning, for example, a dummy wearing clothing.

It should be noted that in order to display a composite image of a high accuracy, in which the shape of a subject in the subject image coincides with that of clothing in the clothing image, it is preferable that the pose of the subject who performs a virtual trial fitting should coincide with the pose (hereinafter, referred to as a pose corresponding to a clothing image) of a dummy that wore clothing when the clothing image was produced.

However, since it is difficult to generate (prepare) a large number of clothing images corresponding to all poses of the dummy, the pose of the subject during a virtual trial fitting will not coincide with poses corresponding to clothing images in many cases.

Therefore, in order to display a highly accurate composite image, a mechanism is required in which the subject is guided so that the pose thereof will coincide with a pose (namely, a predetermined pose) corresponding to a prepared clothing image. Further, the body shape of a dummy does not always coincide with that of the subject.

BRIEF DESCRIPTION OF THE DRAWINGS

FIG. 3 is a view showing an example of a data structure of storage.

FIG. 5 is a view for explaining the outline of processing for acquiring a subject three-dimensional model.

FIG. 6 is a view for explaining the output of processing for selecting a target three-dimensional model.

FIG. 9 is a view showing an example of a notification image.

FIG. 10 is a view showing another example of the notification image.

FIG. 11 is a view showing an example of an appearance of a portable device realized as the image processing system.

FIG. 12 is a view showing an example of use of the portable device.

DETAILED DESCRIPTION

Various embodiments will be described with reference to the accompanying drawings.

In general, according to one embodiment, an image processing apparatus includes a first acquisition module, a receiver, a second acquisition module, a calculator, a first generator and an output module. The first acquisition module is configured to acquire first model data indicating a shape corresponding to a body shape and a pose of a subject. The receiver is configured to receive pose data indicating a pose to be targeted by the subject. The second acquisition module is configured to acquire second model data indicating a shape corresponding to the body shape of the subject corresponding to the shape indicated by the first model data and the pose indicated by the pose data. The calculator is configured to calculate an evaluation value indicating an amount of difference between the shapes indicated by the first model data and the second model data. The first generator configured to generate notification information for indicating the difference based on the evaluation value. The output module is configured to output the notification information.

Figure 1:
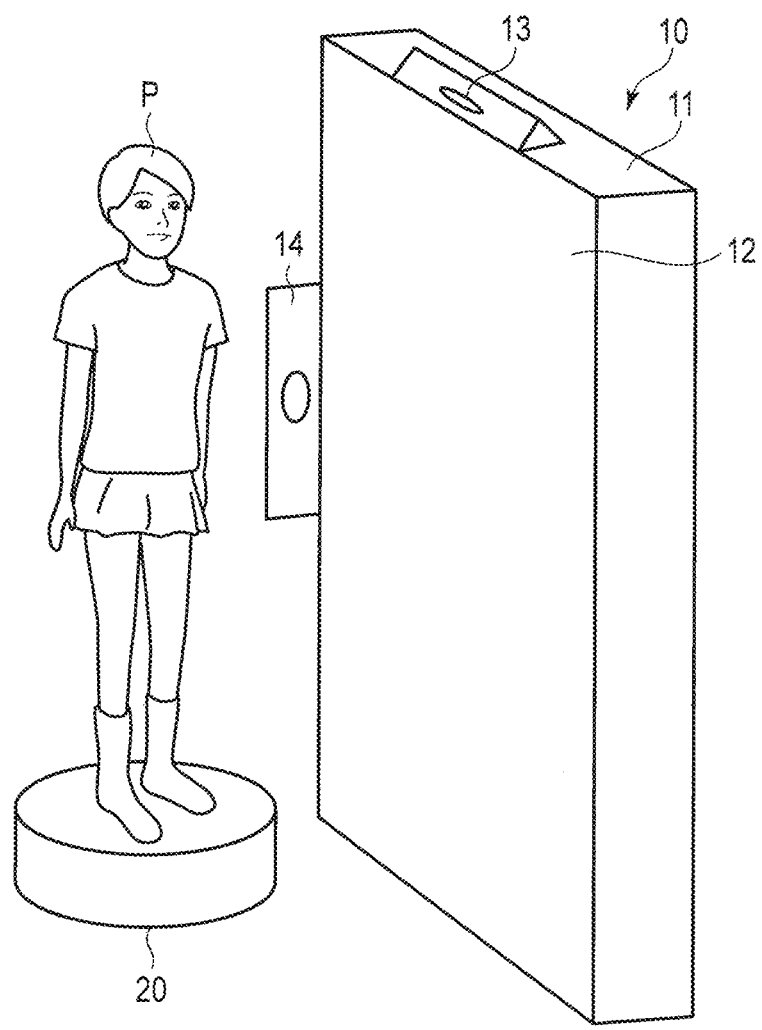
FIG. 1 is a view showing an example of an appearance of an image processing system according to an embodiment.

FIG. 1 is a view showing an example of an appearance of an image processing system including an image processing apparatus, according to an embodiment. The image processing system 10 of FIG. 1 includes a housing 11, a display module 12, a first image-capture module 13 and a second image-capture module 14. Although the image processing apparatus of the embodiment is provided in the housing 11, it is omitted in FIG. 1.

As shown in FIG. 1, the housing 11 of the image processing system 10 has, for example, a rectangular shape, and the display module 12 is fitted in one surface of the housing 11. The display module 12 includes a display device, such as a liquid crystal display, which can display various images.

Further, the first image-capture module 13 and the second image-capture module 14 are included in the housing 11. The first image-capture module 13 includes an image-capture device for sequentially capturing images of a subject P and sequentially outputting the images of the subject P (hereinafter, referred to as depth images). The depth image (depth map) is also called a distance image wherein the distance from the first image-capture module 13 is specified pixel by pixel. As the first image-capture module 13, a depth sensor employed in, for example, a game machine can be used. It is sufficient if the first image-capture module 13 has a configuration capable of acquiring depth images (namely, images having distances from the first image-capture module 13 specified). Therefore, the first image-capture module 13 may have a configuration including, for example, a plurality of cameras and capable of acquiring depth images by stereo-matching.

The second image-capture module 14 includes an image-capture device for sequentially capturing images of the subject P and sequentially outputting the images of the subject P (hereinafter, referred to as the subject images). The subject image is a bitmapped image wherein pixel values indicating the color, luminance, etc., of the subject P are specified pixel by pixel. As the second image-capture module 14, a video camera can be used, for example.

The first and second image-capture modules 13 and 14 capture images of the subject P placed on a turntable 20 shown in FIG. 1. That is, the first and second image-capture modules 13 and 14 are provided in positions in which they can capture images of the subject P placed on the turntable 20. The first and second image-capture modules 13 and 14 may be provided in positions other than those shown in FIG. 1. It is sufficient if they can capture images of the subject P.

The turntable 20 is configured, for example, to be rotatable to desired angles. Moreover, the turntable 20 is positioned so that the subject P can see the display module 12 (more specifically, an image displayed thereon) in a state where the subject P is placed on the turntable 20. The turntable 20 is automatically or manually rotated to orient the subject P in a predetermined orientation.

The image processing system 10 shown in FIG. 1 is used when the subject P, which is, for example, a person (user), performs virtual trial fitting (performs virtual trial fitting of clothing as a trial fitting target).

Virtual trial fitting is realized by displaying a composite image (hereinafter, referred to as a trial fitting image) obtained by superimposing a pre-produced clothing image on a subject image of the subject P. The clothing image includes an image that shows, for example, clothing on a subject, such as a dummy, and is produced by scanning the dummy with the clothing thereon. An inner, an outer, shoes, a hat, etc., are included in the clothing (types of clothing) indicated by a clothing image. The outer includes, for example, tops (coat) worn on the upper half of the body, and bottoms (skirt, trousers) worn on the lower half of the body.

In order to display a trial fitting image of a high accuracy during virtual trial fitting, the image processing system 10 has a function of guiding the subject P so that the pose of the subject P performing the virtual trial fitting will coincide with the pose of a dummy wearing clothing when the clothing image was produced.

By virtue of this function, a subject image of a subject P of substantially the same pose as the pose of the dummy wearing clothing when the clothing image is produced can be obtained.

Although FIG. 1 shows a configuration wherein the display module 12 and the image-capture modules (the first and second image-capture modules 13 and 14) are housed in the housing 11 with the image-processing apparatus provided therein, the image-processing apparatus, the display module 12 and the image-capture modules may be formed as separate apparatuses.

The image processing system 10 may further include an input module (although not shown in FIG. 1) used for inputting (accepting) various data items in accordance with an operation instruction by the subject P. The input module may be formed of one or more of elements that include a mouse, a button, a remote controller, a keyboard, a voice recognition device such as a microphone, and the image recognition apparatus.

The above-described display module 12 and input module may be formed integrally as one body. More specifically, the display module 12 and the input module may be formed as a user interface (UI) module having both the display function and the input function. A liquid crystal display (LCD) with a touch panel, for example, is included in the UI module.

Moreover, the image processing system 10 may further include an external server apparatus connected to the image processing apparatus via, for example, a network so that communication is possible therebetween.

Figure 2:
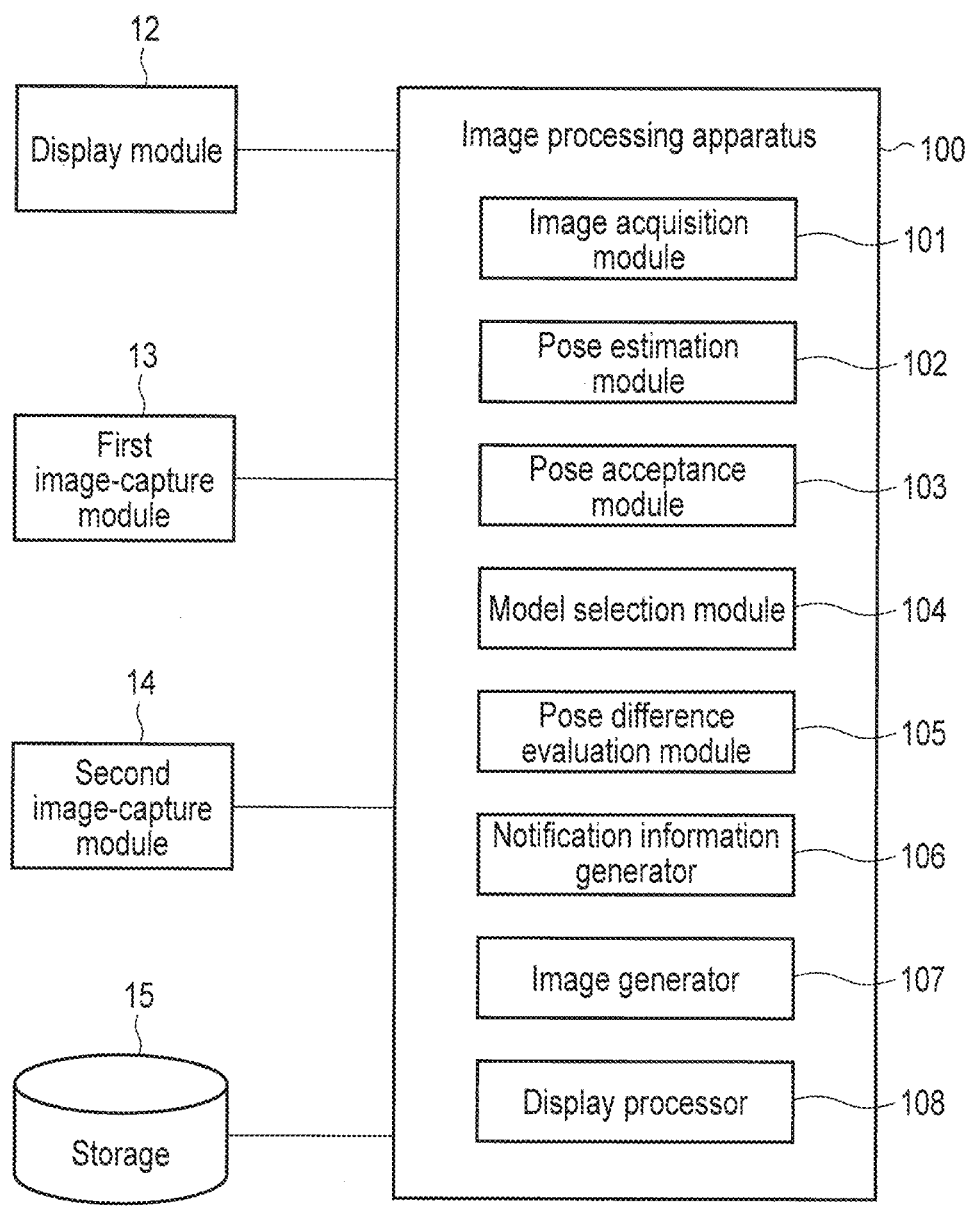
FIG. 2 is a block diagram showing an example of a configuration of the image processing system.

FIG. 2 is a block diagram showing the configuration of the image processing system 10 according to the embodiment. Referring to FIG. 2, a description will be mainly given of the functional configuration of the image-processing apparatus included in the image processing system 10.

As shown in FIG. 2, an image processing apparatus 100 is connected to the display module 12, the first image-capture module 13, the second image-capture module 14, and storage 15 so that it can communicate with them. In FIG. 2, although the display module 12, the first and second image-capture modules 13 and 14 and the storage 15 are formed separately from the image-processing apparatus 100, at least one of these elements may be formed integrally with the image-processing apparatus 100 as one body. Further, although the image-processing apparatus 100 is housed in the housing 11 as described above, it may be realized as, for example, an external server apparatus provided outside the housing 11.

Since the display module 12 and the first and second image-capture modules 13 and 14 have already been described with reference to FIG. 1, they will not be described in detail.

The storage 15 pre-stores model data indicating human body shapes corresponding to a plurality of body shapes and poses (namely, a large number of model data items associated with the body shapes and poses). The model data stored in the storage 15 expresses the shapes of dummies (shapes identical to the shapes of the dummies) wearing a plurality of clothing items when a plurality of clothing images are generated. The model data specifies body shapes and poses corresponding to shapes (the shapes of the dummies) indicated by the model data.

As the model data, three-dimensional polygon data (hereinafter, referred to as a three-dimensional model) can be used, for example. Suppose here that the three-dimensional model is formed of a plurality of vertexes and a plurality of surfaces obtained by connecting the vertexes, and numbers (hereinafter, referred to as vertex numbers) for identifying the three-dimensional positions (coordinates) of the vertexes are attached to the respective vertexes. In addition, the same vertex number is attached (assigned) to corresponding vertexes in different three-dimensional models (namely, vertexes in constitutively the same positions between three-dimensional models).

The storage 15 may be formed in the housing 11, or may be provided in, for example, the above-mentioned external server apparatus.

The image processing apparatus 100 includes an image acquisition module 101, a pose estimation module 102, a pose acceptance module (receiver) 103, a model selection module 104, a pose difference evaluation module 105, a notification information generator 106, an image generator 107, and a display processor 108.

In the embodiment, it is supposed that part or all of these modules 101 to 108 are realized by causing a computer (processor), such as a CPU, to execute a program, namely, by software. However, part or all of these modules 101 to 108 may be realized by hardware, such as an integrated circuit (IC), or by a composite of software and hardware.

The image acquisition module 101 acquires a depth image from the first image-capture module 13. Further, the image acquisition module 101 acquires a subject image from the second image-capture module 14.

The pose estimation module 102 estimates the body shape and pose of the subject P, based on the depth image (i.e., the area of the subject P included in the depth image) acquired by the image acquisition module 101. The pose estimation module 102 acquires a three-dimensional model (first model data) indicating a shape corresponding to the estimated body shape and pose of the subject P. This three-dimensional model may be acquired from the storage 15, an external server, etc., or may be generated in the image-processing apparatus 100. Hereafter, the three-dimensional model acquired by the pose estimation module 102 will be referred to as a subject three-dimensional model for the sake of convenience.

At the time of virtual trial fitting, the pose acceptance module 103 accepts (receives) data (hereinafter, referred to as pose data) indicating a pose that the subject P should regard as a target pose (namely, a pose that the subject P should be guided to assume).

The model selection module 104 selects, from a plurality of three-dimensional models (second model data) stored in the storage 15 (namely, retrieves, from the storage 15), a three-dimensional model (second model data) indicating a shape that corresponds to the body shape of the subject P (namely, a body shape corresponding to a shape indicated by the subject three-dimensional model) and a pose (hereinafter, a target pose) indicated by pose data accepted by the pose acceptance module 103. Hereafter, a three-dimensional model selected by the model selection module 104 will be referred to as a target three-dimensional model for the sake of convenience.

The pose difference evaluation module 105 evaluates (detects) a difference between the shapes indicated by the subject three-dimensional model (indicating the estimated body shape and pose of the subject P) and the target three-dimensional model. (Namely, the pose difference evaluation module 105 evaluates a spatial difference between the poses specified in these three-dimensional models.) Since body shapes specified in the subject three-dimensional model and the target three-dimensional model are body shapes of the subject P, the difference between the shapes indicated by these three-dimensional models mainly indicates a difference in pose. In the description below, the difference in the shapes indicated by the subject three-dimensional model and the target three-dimensional model will be referred to a pose difference for the sake of convenience. The pose difference evaluation module 105 calculates an evaluation value indicating the amount of an attribute difference (an evaluation value corresponding to an attribute difference), based on the subject three-dimensional model and the target three-dimensional model.

On the basis of the evaluation value (detected pose difference) calculated by the pose difference evaluation module 105, the notification information generator 106 generates notification information for notifying the subject P of a pose difference.

The image generator 107 generates a composite image (hereinafter, referred to as a notification image) obtained by superimposing notification information, generated by the notification information generator 106, upon the subject image of the subject P captured by the second image-capture module 14 (the subject image output from the second image-capture module 14).

The display processor 108 performs processing of outputting notification information generated by the notification information generator 106, in order to notify the subject P of a pose difference. Specifically, the display processor 108 displays, on the display module 12, a notification image generated by the image generator 107.

FIG. 3 shows an example of a data structure of the storage 15 shown in FIG. 2. As shown in FIG. 3, the storage 15 stores three-dimensional models (polygon mesh data) indicating human body shapes corresponding to the above-mentioned body shapes and poses. In the storage 15, body shapes ($\beta$) are parameters indicating the degrees of deviation of the body shapes. The body shapes ($\beta$) include a plurality of numerical values for parametrically reciting various body shapes, such as a thin body shape, a fat body shape, a masculine body shape, and a feminine body shape. Poses ($\theta$) are parameters indicating the angles (bending angles) of joints in a human body.

In the example shown in FIG. 3, the storage 15 stores, for example, three-dimensional model 151 that indicates a shape corresponding to body shape $\beta1$ and pose $\theta1$.

Further, as three-dimensional models similar in body shape to three-dimensional model 151, the storage 15 stores three-dimensional model 152 that indicates a shape corresponding to body shape $\beta1$ and pose $\theta2$, and three-dimensional model 153 that indicates a shape corresponding to body shape $\beta1$ and pose $\theta3$.

Furthermore, as three-dimensional models similar in pose to three-dimensional model 151, the storage 15 stores three-dimensional model 154 that indicates a shape corresponding to body shape $\beta2$ and pose $\theta1$, and three-dimensional model 155 that indicates a shape corresponding to body shape $\beta3$ and pose $\theta1$.

Three-dimensional models 151 to 155 shown in FIG. 3 indicate the shapes of dummies that are, for example, in a naked state, in a lightly-dressed state like the subject P of FIG. 1, or in a state of wearing clothing worn when a clothing image was produced, as is described above. It should be noted that in FIG. 3, three-dimensional models other than three-dimensional models 151 to 155 are omitted.

Further, the three-dimensional models stored in the storage 15 can be used by appropriately changing (specifying), for example, the orientation (M) of the shape (i.e., the shape of each dummy) indicated by each model. The orientation (M) is a parameter indicating the angle of rotation.

Referring now to the flowchart of FIG. 4, a description will be given of a processing procedure of the image processing apparatus 100 according to the embodiment.

Suppose here that clothing images corresponding to a large number of clothing items used as trial fitting targets during virtual trial fitting are beforehand generated. The clothing images may be stored in the storage 15 or in, for example, an external server. Suppose also that the storage 15 stores, for each dummy shape (namely, for each body shape and each pose), three-dimensional models that indicate the shapes of dummies that are in the naked state, in the lightly-dressed state like the subject P of FIG. 1, or in the state of wearing clothing worn when a clothing image was produced.

When the user who performs virtual trial fitting uses the image processing system 10, they can mount on the turntable 20 as the subject P. As a result, the first and second image-capture modules 13 and 14 can capture images of the subject P. In the embodiment, suppose that the subject P assumes a predetermined pose while the first and second image-capture modules 13 and 14 are capturing images of the subject P.

At this time, the image acquisition module 101 acquires, from the first image-capture module 13, a depth image of the subject P (a depth image including the subject P) captured by the first image-capture module 13 (step S1).

Based on the depth image acquired in step S1, the pose estimation module 102 estimates body shape βh and pose θh (and orientation Mh) of the subject P, thereby acquiring a three-dimensional model (i.e., a subject three-dimensional model) indicating a shape corresponding to estimated body shape βh and pose θh of the subject P (step S2). For instance, a depth image corresponding to the body shape of the subject P and an initial pose (current pose) is acquired.

Referring then to FIG. 5, a description will be given of the outline of processing in step S2. Suppose that firstly, in step S1, a depth image 201 shown in FIG. 5 is acquired.

In this case, the pose estimation module 102 compares the shape of the subject P in the depth image 201 with a shape (silhouette) indicated by a respective three-dimensional model (for example, three-dimensional models 151 to 155 shown in FIG. 3) stored in the storage 15, while rotating, for example, the three-dimensional models on the depth image 201, as is shown in FIG. 5. Thereby, the pose estimation module 102 selects, from the three-dimensional models stored in the storage 15, a three-dimensional model most similar in shape to the subject P, when this model reaches the same orientation as the subject P in the depth image 201. The pose estimation module 102 can estimate, as body shape βh and pose θh of the subject P, a body shape and an pose corresponding to the shape indicated by the selected three-dimensional model. The pose estimation module 102 acquires, as the subject three-dimensional model, the three-dimensional model indicating a shape corresponding to estimated body shape βh and pose θh of the subject P.

FIG. 5 shows a case where the shape indicated by three-dimensional model 151 is most similar to that of the subject P in the depth image 201, and body shape β1 and pose θ1 corresponding to the shape indicated by three-dimensional model 151 are estimated as body shape βh and pose θh of the subject P. In this case, three-dimensional model 151 is acquired as the subject three-dimensional model.

For the estimation of body shape βh and pose θh of the subject P, a three-dimensional model of the subject P acquired by, for example, a 3D scanner can be used, instead of the above-mentioned depth image of the subject P (the depth image including the subject P) captured by the first image-capture module 13. More specifically, body shape βh and pose θh of the subject P can be estimated by detecting, in the three-dimensional models stored in the storage 15, a three-dimensional model most similar in shape to the three-dimensional model of the subject P acquired by, for example, the 3D scanner.

Returning again to FIG. 4, the pose acceptance module 103 accepts pose data indicating the above-mentioned target pose (the pose to be targeted by the subject P) (step S3). Suppose here that the pose data (the target pose indicated by this data) includes pose θ' and orientation M' of a dummy that, for example, worn clothing as a trial fitting target in virtual trial fitting, and is obtained in advance from, for example, this dummy.

More specifically, a depth image of a dummy assuming the target pose is acquired, and processing corresponding to that of step S2 is executed on this depth image, thereby acquiring (estimating) a body shape, a pose and an orientation corresponding to the shape of the dummy. The pose and orientation included in the thus-obtained body shape, pose and orientation are used as pose θ' and orientation M' (namely, pose data). In this case, the pose acceptance module 103 accepts the pose data including pose θ' and direction M'.

The acquired orientation M' may be changed as aforementioned. More specifically, when orientation M' where, for example, the subject directly faces the first image-capture module 13 is acquired, it may be changed to orientation M'' where the subject is oriented laterally with respect to the first image-capture module 13. In this case, the pose acceptance module 103 accepts pose data including pose θ' and orientation M''. When an image of the subject P is captured, with the turntable 20 rotated along with the subject thereon, the value of M' may be changed in accordance with the rotational angle of the turntable 20. Furthermore, the structure may be modified such that pose θ' is changeable to desired pose θ''.

Although the embodiment employs, as pose data, pose θ' and orientation M' beforehand acquired from a depth image of a dummy, pose θ' and orientation M' acquired from a depth image of a person may be used as pose data. For example, it is also possible to use, as pose θ' and orientation M', an pose and an orientation acquired from a previous depth image of the subject P (or a person other than the subject P). Suppose here that previous depth images of the subjects P are accumulated in the image processing system 10 (more specifically, in, for example, the storage 15) when the subject P used the image processing system 10 previously. In this case, the structure of the image processing apparatus 100 may be modified such that the subject P can select an pose and an orientation as a target pose (pose θ' and orientation M') from among poses and orientations of the subject P acquired from thus-accumulated previous depth image of the subject P. This enables, for example, virtual trial fitting of bottoms to be executed in the same pose of the subject P as the pose in which virtual trial fitting of tops was executed previously.

Moreover, the structure of the image processing apparatus 100 may be modified, for example, such that the subject P can directly designate pose θ' and orientation M' included in pose data, without based on a depth image.

The model selection module 104 selects a target three-dimensional model from a plurality of three-dimensional models stored in the storage 15 (step S4). More specifically, as is shown in FIG. 6, the model selection module 104 selects a target three-dimensional model indicating a shape that corresponds to body shape βh corresponding to a shape indicated by the subject three-dimensional model (namely, the body shape of the subject P estimated by the pose estimation module 102), and to pose θ' and orientation M' (target pose) included in the pose data accepted by the pose acceptance module 103. The target three-dimensional model is obtained by rotating the three-dimensional model corresponding to body shape βh of the subject P and pose θ' of pose data, based on orientation M'. If the target three-dimensional model is not prepared beforehand, the three-dimensional model corresponding to body shape βh of the subject may be modified based on pose θ' and orientation M'.

Subsequently, the pose difference evaluation module 105 evaluates (detects) a difference in pose between the subject three-dimensional model acquired based on the depth image of the subject P, and the target three-dimensional model selected by the model selection module 104 (step S5). At this time, the pose difference evaluation module 105 calculates an evaluation value indicating the amount of a difference in shape (a pose difference) between the subject three-dimensional model and the target three-dimensional model. Suppose that the lower the evaluation value calculated by the pose difference evaluation module 105, the smaller the pose difference.

Figure 7:
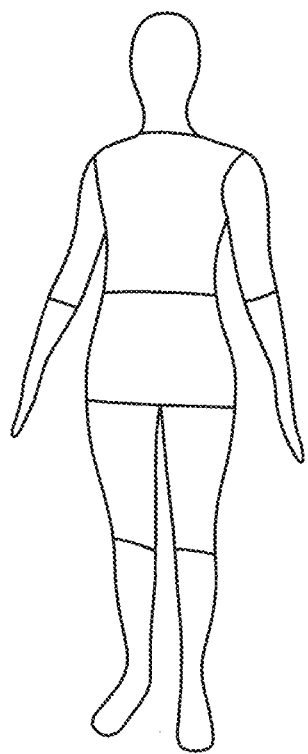
FIG. 7 is a view showing examples of portions for which evaluation values are calculated.

The evaluation value (the pose difference) is calculated portion by portion between the shapes indicated by the subject three-dimensional model and the target three-dimensional model, as is shown in FIG. 7. Namely, differences associated with the positions of the feet, the angle between the legs, the position of the hips, the positions of upper-half-body portions (for example, the arms), the position of the head, the orientations of the shoulders, the positions of the elbows, the positions of the hands, etc., are calculated as the evaluation values.

Figure 8:
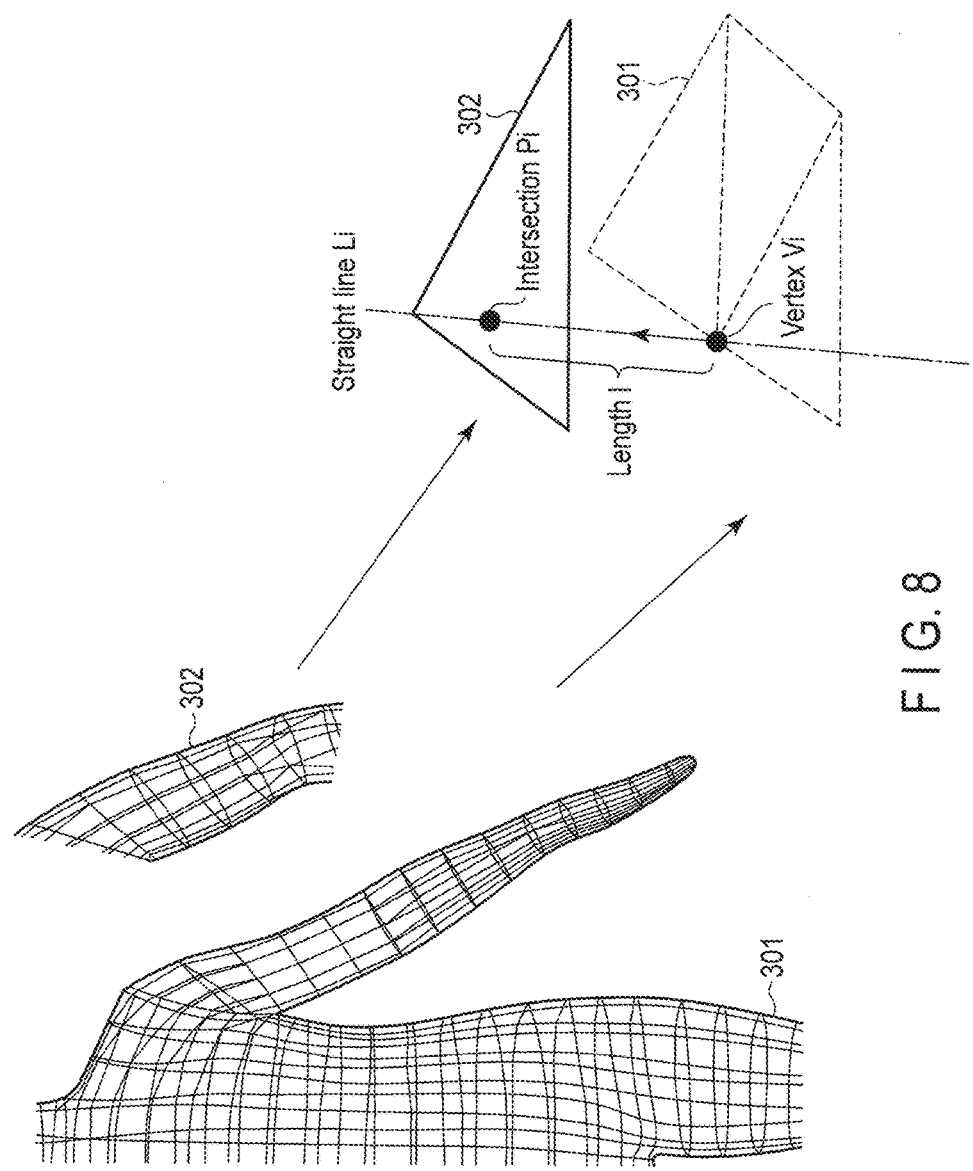
FIG. 8 is a view for specifically explaining an example of an evaluation value.

Referring to FIG. 8, the evaluation value calculated by the pose difference evaluation module 105 will be described in detail. More specifically, a description will be given of a case where an evaluation value indicating a pose difference between arms indicated by a subject three-dimensional model 301 and a target three-dimensional model 302. In FIG. 8, portions other than part of the arms are omitted from the target three-dimensional model 302 for the sake of convenience.

In this case, the pose difference evaluation module 105 calculates, for example, an intersection Pi between a straight line Li including a vertex Vi that is included in the subject three-dimensional model 301 and provides a portion of an arm, and a surface formed by a plurality of vertexes providing a corresponding arm portion in the target three-dimensional model 302.

Suppose here that the straight line Li is parallel to the normal line of a field formed of a plurality of vertexes including the vertex Vi. In the subject three-dimensional model 301, the vertex Vi is included in a plurality of surfaces. In this case, suppose that the straight line Li is parallel to the average orientation of the normal lines of the plurality of surfaces that include the vertex Vi.

There is a case where the straight line Li intersects a plurality of surfaces. In this case, suppose that data indicating, for example, to which portion of a human body as shown in FIG. 7 a respective surface formed by the vertexes belongs, or indicating whether the respective surface is an obverse or reverse surface, is imparted to the respective surface in the subject three-dimensional model 301 and the target three-dimensional model 302. As a result, the surface in the target three-dimensional model, which is used as a target wherein the intersection Pi is detected, can be discriminated from other surfaces. Specifically, when, for example, the vertex Vi is included in an outside surface (away from the trunk) of a portion of an arm of a human body indicated by the subject three-dimensional model 301, even if the straight line Li intersects both outside and inside (close to the trunk) surfaces of a corresponding arm portion of a human body indicated by the target three-dimensional model 302, the intersection Pi between the straight line Li and the outside surface of the arm is detected.

The pose difference evaluation module 105 calculates the distance (length) 1 between the vertex Vi and the intersection Pi, based on the three-dimensional positions of the vertex Vi and the intersection Pi. If there is no intersection Pi (namely, if the straight line Li does not intersect the target three-dimensional model), the distance 1 is supposed to be a predetermined maximum value m, or to be a distance to a nearest vertex on the target three-dimensional model. Such a distance 1 as the above is calculated for each of the vertexes included in the portion of the arm of the subject three-dimensional model, and the average of thus-calculated distances 1 is set as an evaluation value (the amount of the pose difference) for the portion of the arm. Thus, in the embodiment, the evaluation value is calculated based on the subject three-dimensional model.

Although in the embodiment, the evaluation value is calculated based on the subject three-dimensional model, it may be calculated based on the target three-dimensional model. In this case, an intersection is detected between a straight line including a vertex included in an arm portion of the target three-dimensional model 302, and a surface formed by a plurality of vertexes included in a corresponding arm portion of the subject three-dimensional model 301.

Further, although in the embodiment, the distance 1 (the average of distances) between the vertex Vi and the intersection Pi is used as the evaluation value, the distance 1 may be set as the shortest distance between the vertex Vi and an arbitrary surface formed of a plurality of vertexes in the target three-dimensional model. Furthermore, the distance 1 may be set as the distance between the vertexes Vi in the subject three-dimensional model 301, and a vertex in the target three-dimensional model corresponding to the vertex Vi. Since the same vertex number is assigned to corresponding vertexes between different three-dimensional models described above, a vertex in the target three-dimensional model corresponding to the vertex Vi in the subject three-dimensional model 301 can be detected based on the vertex number assigned to the vertex Vi.

Although in FIG. 8, the arm portions of the subject three-dimensional model 301 and the target three-dimensional model 302 are detached from each other, the above-mentioned evaluation value is calculated in a state where, for example, a vertex or the central point of a surface in a portion or the entire portion of the subject three-dimensional model 301 is made to coincide with a vertex or the central point of a surface in a portion or the entire portion of the target three-dimensional model 302.

Since the subject three-dimensional model 301 is acquired based on a depth image including an image of the subject P captured by the first image-capture module 13, surfaces (shapes of the surfaces) of the model other than the surface of the subject P that faces the first image-capture module 13 (namely, the surface of the subject P captured by the first image-capture module 13) may not coincide with the actual shape of the subject P. Because of this, in step S5, the evaluation value may be calculated only based on the distance 1 between the vertex Vi corresponding to the surface whose image was captured by the first image-capture module 13, and the intersection Pi. Further, for the distance 1 between the intersection Pi and the vertex Vi included in a surface other than the surface whose image was captured by the first image-capture module 13, weight reduction may be made to reduce the influence on the evaluation value.

Although the embodiment employs a three-dimensional model (three-dimensional polygon data) as model data, it is sufficient if the model data enables calculation of the amount of the pose difference (i.e., the evaluation value) between the pose of the subject P and a target pose. More specifically, the model data may be a depth image (data) acquired by, for example, capturing an image of the subject P or an image of a dummy assuming the target pose, using the first image-capture module 13. Alternatively, the model data may be point-group data wherein three-dimensional coordinates (x, y and z coordinates) are defined for each of the pixels that form the depth image.

The evaluation value may be calculated using at least two selected from the above-mentioned three-dimensional model, depth image and point-group data. The evaluation value may also be calculated from model data of different attributes, such as a depth image including the subject P, and the target three-dimensional model, by converting the pose of the subject P and the target pose into comparable forms.

Furthermore, the evaluation value may be calculated by comparing pose θh and orientation Mh of the subject P with pose —θ' and orientation M' (target pose) included in pose data, without using body shape βh of the subject P. In this case, orientation Mh of the subject P should be estimated by the above-described pose estimation module 102, based on a depth image along with body shape βh and pose θh.

At this time, on the basis of the evaluation value calculated portion by portion (step S6), the notification information generator 106 determines whether it is necessary to notify the subject P of a pose difference. In this case, the notification information generator 106 determines whether the evaluation value (pose difference) calculated portion by portion is equal to or less than a preset value (hereinafter, referred to as a threshold). When the evaluation value is equal to or less than a threshold, this means that in the subject three-dimensional model and the target three-dimensional model, the pose difference of portions where the evaluation value has been calculated is small (or the portions coincide with each other in pose). In contrast, when the evaluation value is not equal to or less than the threshold, this means that in the subject three-dimensional model and the target three-dimensional model, the pose difference of portions where the evaluation value has been calculated is large.

In step S6, when at least one of the evaluation values calculated portion by portion is not equal to or less than the threshold, it is determined necessary to notify the subject P of the pose difference. In contrast, when all evaluation values calculated portion by portion are equal to or less than the threshold, it is determined unnecessary to notify the subject P of the pose difference.

As described above, the image processing system 10 of the embodiment is used when the subject P performs virtual trial fitting. At this time, depending upon a position where clothing as a trial fitting target is worn in virtual trial fitting, it may be necessary to make all portions of the subject P coincide with a target pose, or it may be sufficient if only some of the portions of the subject P coincide with the target pose.

More specifically, if clothing as the trial fitting target is tops, it is sufficient if at least the upper half body of the subjects P is made to coincide with the target pose. Further, if clothing as the trial fitting target is bottoms, it is sufficient if at least the lower half body of the subjects P is made to coincide with the target pose.

Therefore, in the embodiment, different thresholds may be set in different portions where the evaluation value is calculated, so that only a portion corresponding to a position where clothing as the trial fitting target is worn will be regarded as an evaluation target of the pose difference (namely, so that the pose difference only in this portion will be detected). For example, if only the upper half body of the subject P is used as the evaluation target, it is sufficient if a threshold for the lower half body is set high, while if only the lower half body of the subject P is used as the evaluation target, it is sufficient if a threshold for the upper half body is set high.

Furthermore, depending on the type of clothing for virtual trial fitting, the difference between the pose of the subject P and the target pose may be ignored if it falls within an allowable range.

More specifically, when clothing as the trial fitting target is inner or tight clothing, the allowable range of the difference between the pose of the subject P and the target pose is small, since (the area of) the subject P may fall outside (the area of) the clothing because of the pose difference. In contrast, when clothing as the trial fitting target is outer or loose clothing, the allowable range of the difference between the pose of the subject P and the target pose is large, since (the area of) the subject P may fall within (the area of) the clothing even when there is a pose difference. In view of this, in the embodiment, different thresholds may be set in accordance with different types of clothing as trial fitting targets. Specifically, when clothing as the trial fitting target is inner or tight clothing, the threshold should be set low, while when clothing as the trial fitting target is outer or loose clothing, the threshold should be set high.

When it is determined necessary to notify the subject P of a pose difference (YES in step S6), the notification information generator 106, on the basis of the evaluation value calculated by the pose difference evaluation module 105, generates notification information for notifying the subject P of the pose difference (step S7). At this time, the notification information generator 106 generates notification information for each of the portions wherein the evaluation value has been calculated.

Subsequently, the image generator 107 generates a notification image wherein the notification information generated in step S7 is superimposed on a subject image (color image) including the subject P captured by the second image-capture module 14 (step S8).

The display processor 108 displays a notification image generated in step S8 on the display module 12 (step S9).

A description will now be given of the notification image displayed in step S9. As shown in FIG. 9, in the notification image, for example, a message (character string) 401, which corresponds to the evaluation value, is displayed near a respective portion of the subject P in the notification image as notification information generated based on the evaluation value calculated for the respective portion. In the notification image, the evaluation value may be displayed as the notification information.

Moreover, as shown in FIG. 9, in the notification image, the silhouette (the outline of the shape) 402 of the target three-dimensional model, for example, may be displayed as a guidance image. The silhouette 402 of the target three-dimensional model can be obtained by, for example, projecting the target three-dimensional model on a screen. The silhouette 402 of the target three-dimensional model is superimposed on the subject P in a position where, for example, a feature point or region on the subject P coincides with a feature point or region on the silhouette 402.

In addition, the silhouette 402 of the target three-dimensional model may be processed based on the evaluation value, so that the pose difference can be noticed to the subject P. More specifically, a mark, for example, for notifying the subject P of a portion where the pose difference occurs may be attached. Alternatively, a color corresponding to the evaluation value calculated for the portion may be imparted to the corresponding portion of the silhouette 402 of the target three-dimensional model.

Furthermore, in the notification image, the silhouette of the target three-dimensional model may be wholly (i.e., as a whole body) or partially displayed.

As shown in FIG. 10, a target three-dimensional model (three-dimensional polygon data) 403 may be displayed in place of the silhouette 402 of the target three-dimensional model.

Namely, in the embodiment, the notification information (i.e., the notification image) output to give notification of the pose difference includes, for example, the evaluation value calculated by the pose difference evaluation module 105, the message generated on the basis of the evaluation value, or (a shape indicated by) the target three-dimensional model processed on the basis of the evaluation value.

On the notification image, for example, an arrow indicating a direction in which each portion of the subject P is to be moved may be displayed as data necessary to make the pose of the subject P coincide with the target pose. On the notification image, a distance or position, through or to which each portion is moved, may also be displayed. More specifically, when a pose difference occurs in a portion of an arm, a direction, in which each joint of the arm is bent, or a position, in which it is positioned, can be displayed on the notification image. Further, the current angle of the arm and a target arm angle can also be displayed using, for example, a graph or a meter.

In addition, although a vertical or horizontal pose difference (that is, a difference in a direction substantially perpendicular to the optical axes of the first and second image-capture modules 13 and 14) can be relatively easily detected on the notification image, a pose difference in a depth direction (that is, a difference in a direction along the optical axes of the first and second image-capture modules 13 and 14) are hard to detect on the notification image. Therefore, the evaluation value (message), the direction of movement, etc., may be displayed only in association with a portion having a pose difference in the depth direction (i.e., substantially along the optical axes of the image-capture modules 13 and 14). In this case, visibility of the pose difference of a portion whose pose difference is hard to understand can be enhanced, compared to a case where evaluation values and movement directions of all portions are displayed.

Although in the above description, notification information is output (provided) by displaying a notification image in which the notification information is superimposed on a subject image, it may be output through, for example, audio, instead of an image. In this case, a message "Please bring the right hand slightly forward," "Please slightly open the left arm," etc., generated based on, for example, the evaluation value, may be output through audio, with the subject image displayed on the display module 12. The notification information may also be output using both an image and audio. More specifically, while a notification image, in which a target three-dimensional model is superimposed on a subject image, is displayed, the above-mentioned message is output. Furthermore, the notification information may be output as a sound effect for notifying the subject P of whether a pose difference has occurred.

Namely, in the embodiment, the notification information is generated as data that enables the subject P to sense a pose difference.

After step S9 is executed, the processing returns to step S1, whereby the above-described processing is repeated.

The subject P can change its pose to make it coincide with a target pose (i.e., a shape indicated by the target three-dimensional model), referring to the notification image displayed on the display module 12. Thus, when steps S1 et seq. have been executed after the pose was thus changed, it is determined in step S6 that the pose difference does not have to be notified to the subject P.

Thus, when it is determined in step S6 that the pose difference does not have to be notified to the subject P (NO in step S6), the image acquisition module 101 acquires a subject image (color image) including the subject P captured by the second image-capture module 14 (step S10). The image acquisition module 101 may acquire a subject image (depth image) including the subject P output by the first image-capture module 13 with the subject image (color image) including the subject P captured by the second image-capture module 14, and may also acquire the body shape and pose of the subject P estimated by the pose estimation module 102.

The subject image acquired by the image acquisition module 101 is stored in the storage 15, for example (step S11).

Namely, in the embodiment, a subject image including the subject P captured by the second image-capture module 14 at a timing in which the amount of the difference in shape between the subject three-dimensional model and the target three-dimensional model is equal to or less than a threshold (i.e., when the pose of the subject P coincides with the target pose) is stored in the storage 15. The fact that the pose of the subject P coincides with the target pose (or the subject image has been stored in the storage 15) may be notified to the subject P using an audio or an effect sound. It is sufficient if the subject image includes the subject P having a pose coinciding with the target pose, and the timing (time) of storing the subject image in the storage 15 may differ from the time when the image of the subject P was captured.

The subject image stored in the storage 15 in step S11 is used for generation of a trial fitting image in virtual trial fitting mentioned above. More specifically, a trial fitting image, in which a clothing image including clothing as a trial fitting target is superimposed on a subject image stored in the storage 15, can be generated and displayed on a portable device, such as a smart phone or a tablet computer used by the subject P (user). In this case, the subject image stored in the storage 15 and the clothing image including clothing as the trial fitting target is transmitted to the portable device in accordance with, for example, a user operation on the device. This being so, the user can confirm, on the portable device, a state where the user wears clothing as the trial fitting target (namely, a state where the user virtually wears the clothing). The trial-fitting image may be generated in the image processing apparatus 10 and displayed on the display module 12. Alternatively, the trial-fitting image may be generated and displayed in an external device other than the portable device.

As an example of use of the embodiment, it is supposed that a clothing image including clothing worn in, for example, a magazine, by a fashion model is beforehand produced, and that pose data indicating the pose of the fashion model is accepted. In this case, the subject P can virtually try on, using the image processing system 10, the clothing worn by the fashion model in the magazine, in the same pose as the pose of the fashion model.

The above-mentioned subject image may be configured to be stored (uploaded) in, for example, an external server apparatus.

Figure 4:
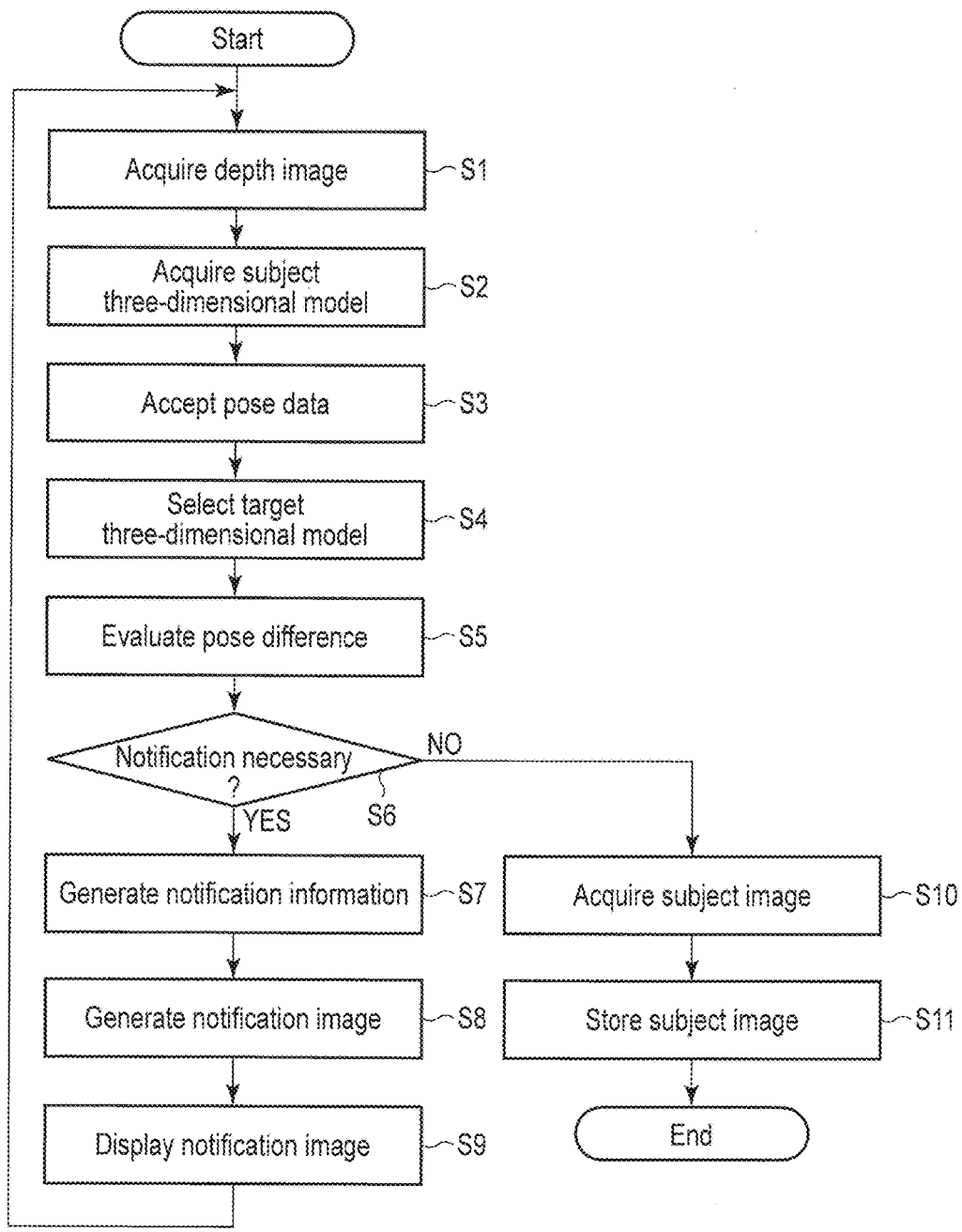
FIG. 4 is a flowchart showing an example of a processing procedure of an image processing apparatus.

In addition, in the processing shown in FIG. 4, (items of notification information for indicating) pose differences in various portions of the subject P, associated with the positions of the feet, the angle between the legs, the position of the hips, the position of the upper half body, the position of the head, the orientations of the shoulders, the positions of the elbows, the positions of the hands, etc., may be sequentially notified (given). In this case, after the pose difference of a certain portion of the subject P is changed to coincide with a shape indicated by the target three-dimensional model, notification information for indicating the pose difference of a subsequent portion is output. For instance, after notification information for indicating differences in the positions of the feet is output, notification information for indicating the difference in the angle between the legs is output. Thus, items of notification information can also be sequentially output in an order of tracking back the joints of the legs, beginning with a portion contacting the ground.

As described above, in the embodiment, a subject three-dimensional model (first model data) indicating a shape corresponding to the body shape and pose of the subject P is acquired, then a target three-dimensional model (second model data) indicating a shape corresponding to the body shape of the subject P and a target pose is acquired, then an evaluation value indicating the difference between the shapes indicated by the subject three-dimensional model and the target three-dimensional model is calculated, and then notification information for indicating the difference is generated on the basis of the evaluation value, and is output. In this case, a notification image generated by superimposing the notification information on a subject image is displayed on the display module 12. Further, the notification information includes the evaluation value, a message generated based on the evaluation value, the target three-dimensional model processed based on the evaluation value, or the like.

By virtue of the above structure, in the embodiment, the difference between the pose of the subject P and a predetermined pose (target pose) can be notified (a notification image can be displayed). This enables the subject P to move its trunk, arms and legs while seeing the notification image, thereby enabling the same to assume a pose similar to the target pose. In other words, in the embodiment, the subject P can be guided to assume a pose coinciding with the target pose (i.e., a pose corresponding to a clothing image generated beforehand).

Moreover, in the embodiment, a subject image including the subject P captured by the second image-capture module 14, when the evaluation value is equal to or less than a threshold, is stored in the storage 15. By virtue of this structure, a subject image, which includes the subject P assuming a pose coinciding with the target pose, can be stored in the embodiment. Using this subject image, a trial fitting image of high accuracy can be generated and displayed.

Also, the embodiment is constructed such that the evaluation value is calculated portion by portion, and it is determined whether each of the evaluation values calculated in respective portions is equal to or less than a threshold, thereby evaluating (detecting) portion by portion whether there is a pose difference. In addition, by setting thresholds in respective portions, only the pose difference of a portion to be notified to the subject P can be detected, for example.

Moreover, in the embodiment, items of notification information generated portion by portion in the subject P are gradually (sequentially) output (namely, notification images are gradually displayed), which enables the pose difference of the subject P to be gradually corrected portion by portion. In addition, by sequentially outputting items of notification information in an order of, for example, tracking back the joints of the legs, beginning with portions (such as feet) contacting the ground, the pose difference of each portion of the subject P can be corrected in a state in which the subject P assumes a more stable pose.

Although in the embodiment, the pose of the subject P is made to coincide with a target pose, using a single pose data item, this structure can be modified, for example, such that a plurality of target pose data items are prepared, and the pose of the subject P is sequentially guided to a plurality of target poses indicated by the data items. In this case, it is sufficient if the processing shown in FIG. 4 is executed for each pose data item. As a result, subject images including the subject P that assume the same poses as the target attributes can be sequentially recorded.

Although in the embodiment, the subject P is assumed to be a person, it may be, for example, a dummy and the like. In this case, the image processing system 10 in the embodiment can be used when the pose of the dummy is required to coincide with a predetermined pose. The predetermined pose includes, for example, a pose set beforehand, and a pose of the dummy whose image was captured previously. Furthermore, when images of different dummies are captured in different places, the image processing system 10 can be used to cause, for example, the pose of a dummy in a certain place to coincide with that of a dummy in another place.

The image processing apparatus 100 of the embodiment may be include a plurality of devices. More specifically, the image processing apparatus 100 may be constructed such that part of the processing shown in FIG. 4 is executed by a module housed in the housing 11, and the remaining part of the processing is executed by an external device (such as a server).

The image processing system 10 of the embodiment may be realized as such a portable device 500 as shown in FIG. 11. When the image processing system 10 is realized as the portable device 500, the portable device 500 includes a main body 501, a display module 502, a first image-capture module 503 and a second image-capture module 504, which correspond to the housing 11, the display module 12, the first image-capture module 13 and the second image-capture module 14 included in the image processing system 10, respectively. The device 500 further includes an image processing apparatus corresponding to the above-described image processing apparatus 100. This image processing apparatus is not shown, but is provided in the main body 501. This image processing apparatus has the same configuration as that of FIG. 2.

Since the portable device 500 constructed as the above can execute the same processing as that shown in FIG. 4, it can guide the subject P so that its pose coincides with a target pose.

When the subject P uses the portable device 500, its image must be captured by the first and second image-capture modules 503 and 504 incorporated in the portable device 500. The subject P can use the portable device 500 by, for example, grasping a bar instrument 510 having a tip provided with the portable device 500, as is shown in FIG. 12. In this case, however, an arm grasping the bar instrument 510 is immovable. Therefore, even if such a notification image as mentioned above is displayed on the display module 502, it is difficult to cause the pose of the subject P to coincide with a target pose.

In view of the above, suppose that the portable device 500 has a function of excluding a particular body portion (in this case, the left arm) from evaluation targets for the pose difference. In this case, even when a particular portion does not coincide with the target pose, a subject image can be stored in the storage 15 when the other portions coincide with the target pose.

Also suppose that the particular portion excluded from the evaluation targets is designated by, for example, the subject P. Further, since the portable device 500 is supposed to be used in a mode as shown in FIG. 12, a portion (in this case, the left arm) positioned closer to the first or second image-capture module 503 or 504 than other portions may be automatically excluded from the evaluation targets.

Since various types of processing in the embodiment can be realized by a computer program, an advantage similar to that of the embodiment can be obtained simply by installing the computer program in a computer through a computer-readable storage medium storing the computer program, and executing the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a memory configured to store an image processing program; and
   a processor coupled to the memory and being configured to execute the image processing program to control the image processing apparatus to at least:
   acquire first model data indicating a shape corresponding to a body shape of a subject and a pose of the subject;
   acquire second model data indicating a shape corresponding to the body shape of the subject corresponding to the shape indicated by the first model data and a target pose to be targeted by the subject;
   calculate an evaluation value indicating an amount of difference between the shapes indicated by the first model data and the second model data, respectively;
   based on the evaluation value being greater than a threshold, output notification information for notifying a change in the pose of the subject for reducing the difference amount;
   based on the evaluation value being equal to or less than the threshold, store an image of the subject captured by a camera in the memory; and
   superimpose a clothing image on the stored subject image to generate a trial fitting image in which the pose of the subject substantially coincides with the target pose.

2. The image processing apparatus of claim 1, wherein the processor is further configured to execute the image processing program to control the image processing apparatus to:
   generate a notification image in which the notification information is superimposed on an image of the subject captured by the camera, and
   output the notification image.

3. The image processing apparatus of claim 1, wherein the processor is further configured to execute the image processing program to control the image processing apparatus to:
   calculate evaluation values portion by portion in the shapes indicated by the first model data and the second model data; and
   based on each of the evaluation values being equal to or less than the threshold, store the captured image in the memory.

4. The image processing apparatus of claim 3, wherein different thresholds are set for different portions of the shapes.

5. The image processing apparatus of claim 1, wherein the processor is further configured to execute the image processing program to control the image processing apparatus to:
   calculate evaluation values indicating an amount of difference between the shapes indicated by the first model data and the second model data, portion by portion in the shapes; and
   output the notification information portion by portion.

6. The image processing apparatus of claim 1, wherein the notification information comprises one of the evaluation value, a message generated based on the evaluation value, and the second model data processed based on the evaluation value.

7. A method executed by an image processing apparatus including a processor, the method comprising:
   acquiring first model data indicating a shape corresponding to a body shape of a subject and a pose of the subject;
   acquiring second model data indicating a shape corresponding to the body shape of the subject corresponding to the shape indicated by the first model data and a target pose to be targeted by the subject;
   calculating an evaluation value indicating an amount of difference between the shapes indicated by the first model data and the second model data, respectively;
   based on the evaluation value being greater than a threshold, outputting notification information for notifying a change in the pose of the subject for reducing the difference amount;
   based on the evaluation value being equal to or less than the threshold, storing an image of the subject captured by a camera in the memory; and
   superimposing a clothing image on the stored subject image to generate a trial fitting image in which the pose of the subject substantially coincides with the target pose.

8. A non-transitory computer-readable storage medium having stored thereon a computer program which comprises instructions which, when executed by a computer, cause the computer to perform operations comprising:
   control acquiring first model data indicating a shape corresponding to a body shape of a subject and a pose of the subject;
   control acquiring second model data indicating a shape corresponding to the body shape of the subject corresponding to the shape indicated by the first model data and a target pose to be targeted by the subject;
   calculating an evaluation value indicating an amount of difference between the shapes indicated by the first model data and the second model data, respectively;
   based on the evaluation value being greater than a threshold, control outputting notification information for notifying a change in the pose of the subject for reducing the difference amount;
   based on the evaluation value being equal to or less than the threshold, storing an image of the subject captured by a camera in the memory; and
   superimposing a clothing image on the stored subject image to generate a trial fitting image in which the pose of the subject substantially coincides with the target pose.

9. The image processing apparatus of claim 1, wherein the notification information comprises information for notifying a difference related to portions of the first model data and the second model data.

10. The method of claim 7, further comprising:
    generating a notification image in which the notification information is superimposed on an image of the subject captured by the camera; and
    outputting the notification image.

11. The method of claim 7, further comprising:
calculating evaluation values portion by portion in the shapes indicated by the first model data and the second model data; and
based on each of the evaluation value being equal to or less than the threshold, storing a captured image in the memory.

12. The method of claim 11, wherein different thresholds are set for different portions of the shapes.

13. The method of claim 7, wherein the notification information comprises information for notifying a difference related to portions of the first model data and the second model data.

14. The method of claim 7, further comprising:
calculating evaluation values indicating an amount of difference between the shapes indicated by the first model data and the second model data, portion by portion in the shapes; and
outputting the notification information, portion by portion.

15. The method of claim 7, wherein
the notification information comprises one of the evaluation value, a message generated based on the evaluation value, and the second model data processed based on the evaluation value.

* * * * *